March 16, 1948. R. W. JENSEN 2,437,961
THERMOSTATIC SHUTTER CONTROL AND SURGE PROTECTION
Filed March 12, 1945 4 Sheets-Sheet 3

INVENTOR.
Raymond W. Jensen
BY
ATTORNEY

March 16, 1948. R. W. JENSEN 2,437,961
THERMOSTATIC SHUTTER CONTROL AND SURGE PROTECTION
Filed March 12, 1945 4 Sheets-Sheet 4

INVENTOR.
Raymond W. Jensen
BY

ATTORNEY

Patented Mar. 16, 1948

2,437,961

UNITED STATES PATENT OFFICE 2,437,961

THERMOSTATIC SHUTTER CONTROL AND SURGE PROTECTION

Raymond W. Jensen, Los Angeles, Calif., assignor to The Garrett Corporation, Airesearch Manufacturing Company division, Los Angeles, Calif., a corporation of California Application March 12, 1945, Serial No. 582,318

11 Claims. (Cl. 236—35)

This invention relates to heat exchangers for viscous fluids (such as oil coolers) equipped with shutters for controlling the flow therethrough of a heat exchange medium (such as cooling air) and has as its general object to improve temperature and pressure responsive mechanism for controlling the shutters. The invention is particularly useful in connection with oil coolers for aircraft which are subject to widely varying conditions of operation.

Two important factors involved in the operation of oil coolers are (1) the heat to be abstracted from the oil and (2) the heat absorbing capacity of the cooling air flowing through the cooler. Both of these are variable. The quantity of heat to be absorbed from the oil during a given period of time depends upon the volume and temperature of the heated oil passing through the cooler during this period. At high operational speed the rate of flow and the amount of heat carried by the oil per unit of time is greater than at low operational speed. The heat absorbing capacity of the cooling air depends upon the quantity and temperature of the air which flows through the air passages of the cooler during the given period of time.

The problem of oil temperature control is complicated by the fact that at times (such as when the plane is passing through air at extremely low temperatures) there will be an abnormally rapid rate of transfer of heat from the oil to the air or an unduly prolonged period of transfer at a moderately rapid rate, and the oil will congeal on the external surfaces of the air tubes within the cooler and thereby reduce the cross sectional area of the oil flow passages within the cooler core, resulting in restriction of the oil flow through the core and consequent increase in the pressure of the oil at the cooler inlet. This condition usually arises from an excessively rapid drop in the temperature of the air or an increase of air flow which cannot be adequately responded to by the usual thermostatic control mechanism. In addition to reducing the rate of flow, the layers of congealed oil, being of low heat conductivity, reduce the transfer of heat from the oil to the air, and the oil, speeded up by the restriction in the flow path, pases through the cooler at high speed and leaves at a temperature much higher than normal. Where the shutters are thermostatically controlled, the effect of this hot oil is to maintain the shutters open, thus aggravating the condition which causes the oil to congeal on the air tubes.

Under extreme conditions of operation, or where the cooler has been exposed to low temperature for a prolonged period of non-use, the entire body of oil within the core may become congealed to stop or prevent the circulation of oil through the core.

Having in mind the above described problems, the general object of the invention is to provide a heat exchanger for viscous liquids, equipped with: (1) shutters for controlling the flow through the cooler of a heat exchange fluid adapted to vary the heat content of the viscous liquid; (2) means responsive to the temperature of the viscous liquid (preferably as it leaves the cooler) for controlling the opening and closing of the shutters for normal operation of the cooler, in such a manner that an increase in temperature of the liquid will result in increased opening of the shutters and consequently increased flow of the cooling fluid; (3) means responsive to the inlet pressure of the viscous liquid adapted, when said pressure exceeds a predetermined maximum for normal operation (as when congelation begins to occur) to override the temperature responsive control and cause the shutters to move toward closed position so as to reduce the congealing effect and permit the hot liquid in the cooler to thaw out the liquid flow passages; (4) a warm-up jacket for utilizing the hot liquid for the thawing process; (5) a pressure responsive valve for controlling the flow through the warm-up jacket in such a manner that an increase in back pressure in the core will result in an increased flow through the warm-up jacket, bypassing the core, while a decrease in back pressure will result in a decrease in flow through the warm-up jacket and a corresponding increase in flow through the core until, when the liquid flow passages in the core are fully opened, and the liquid is warm and fluid, the flow through the warm-up jacket will be shut off and the entire flow will be routed through the core; (6) a bypass to permit the liquid to pass directly from the cooler inlet to the cooler outlet, bypassing both the core and the warm up jacket when the pressure at the inlet rises to a level at which there is danger of the walls of the core passages and warm up jacket being ruptured or distended; (7) a surge valve assembly including a bypass valve adapted to open up the bypass and an inlet protection valve adapted to close the inlet when the pressure rises to this abnormally high level (as when surges of abnormally high pressure occur in the inlet line or when the cooler is completely congealed).

A more particular object of the invention is to provide a combined temperature and pressure responsive control mechanism of the type indicated above which is especially suitable for use in connection with oil coolers of the type which operate on a small pressure drop, such as the "Free Flow" type (an example of which is disclosed in the Soren K. Andersen application, Serial No. 582,080, for Cooler for viscous liquids, filed March 10, 1945), in which there is provided, within the normal liquid flow passage in the core, a "Free Flow" path of less restriction than the balance of the flow passage, in which flow may be maintained or started when the balance of the flow passage is obstructed by congelation. In attaining this object, the invention utilizes a shutter operating servomotor which embodies a piston that is adapted to be moved hydraulically in both directions by oil coming from the inlet side of the cooler and therefore subject to inlet pressure. The invention thus provides for increased shutter operating power which adapts the mechanism to the control of larger cooler shutter installations.

A further object of the invention is to provide an improved and simplified combination thermostatic and pressure override control mechanism embodying a single control valve which is responsive both to temperature and pressure variations.

Another object is to provide a control mechanism embodying such a control valve which may readily be adjusted for varying the temperature response of the valve.

Further objects and advantages of the invention will be brought out in the following part of the specification.

Referring to the drawings which are for illustrative purposes only.

An oil cooler of the type to which the invention is particularly adaptable customarily embodies a cylindrical shell 12 divided by a plurality of baffles 13 (extending parallel to the longitudinal axis of the cooler) into a plurality of compartments which are connected by ports in the opposite ends of alternate baffles to form a tortuous flow passage through the cooler core, which comprises, in addition to the shell 12 and baffles 13, a number of bundles of tubes 14 within the respective compartments between the baffles 13. The tubes 14 are provided with expanded hexagonal heads 16 which are brazed together and to the baffles 13 to close the ends of the flow path compartments. The oil to be cooled enters the core through an inlet port 17 in the shell 12 (Fig. 3) communicating with one end of the tortuous flow path, flows through this tortuous path in the spaces between the tubes 14, and leaves the core through an outlet 18 in the shell 12 (Fig. 1) at the other end of the tortuous flow path.

Figure 3:
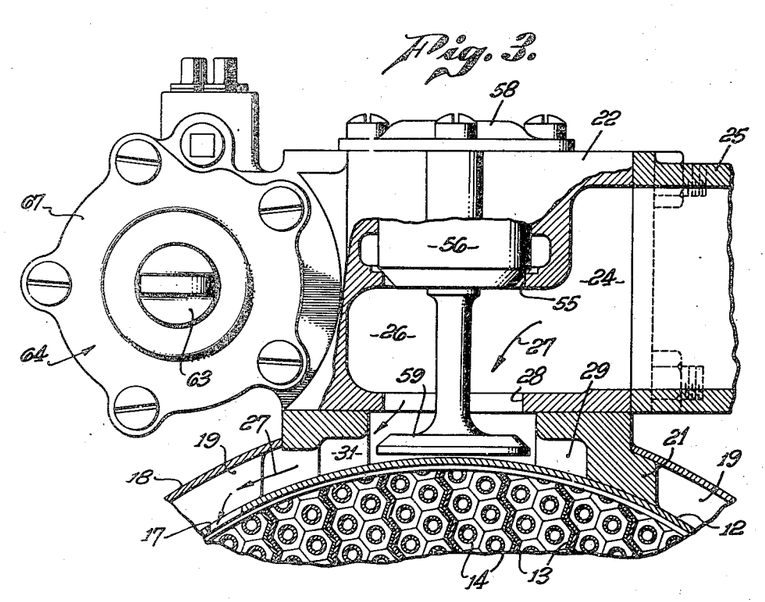
Fig. 3 is a view of the upper portion of the cooler, partly in end elevation and partly in transverse section, taken on the line 3—3 of Fig. 2.

For warming up the core when it tends to become congealed, there is provided a jacket 18 which cooperates with the core shell 12 to define a warm up passage 19 covering all or a portion of the outer surface of the core. Although the warm up jacket may extend only partially around the core, it may also be arranged, as shown in Fig. 3, to extend entirely around the core. The ends of the jacket 18 are secured to a valve base 21 which is in turn secured, as by welding, to the outer surface of the shell 12.

The control mechanism of my invention is embodied in a unit, the operating parts of which are housed in a case 22 which is bolted, by means of bolts 23 extending downwardly therethrough, to the valve base 21. The case 22 has an inlet port 24 to which the heated oil from the aircraft engine is supplied through an inlet line 25 coupled thereto. From the inlet port 24, the oil enters a surge valve chamber 26 from which it normally flows, as indicated by the arrows 27, through an inlet valve port 28 into an inlet chamber 29 defined within the valve base 21, and thence through an opening 31 in the base 21 into the warm up passage 19. Then it will normally flow through the core inlet 17 into the core, but when increased back pressure occurs in the core, it may flow on through the warm up passage.

Figure 1:
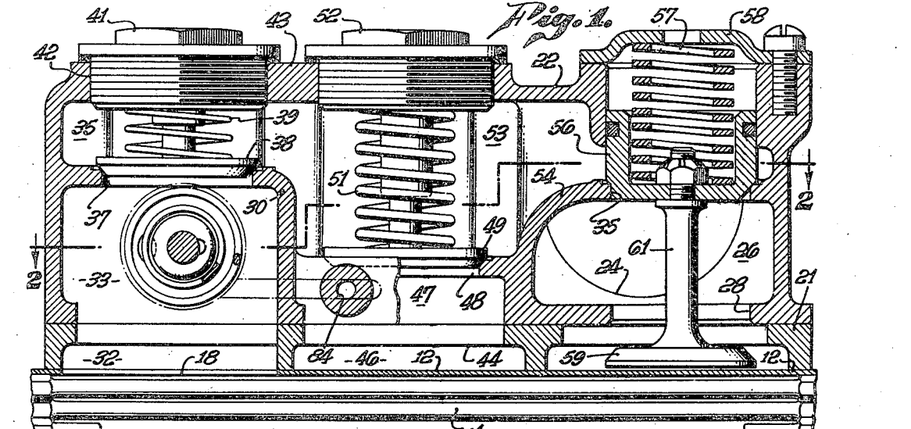
Fig. 1 is a longitudinal sectional view through the upper portion of an oil cooler, taken on the line 1—1 of Fig. 2.
Figure 2:
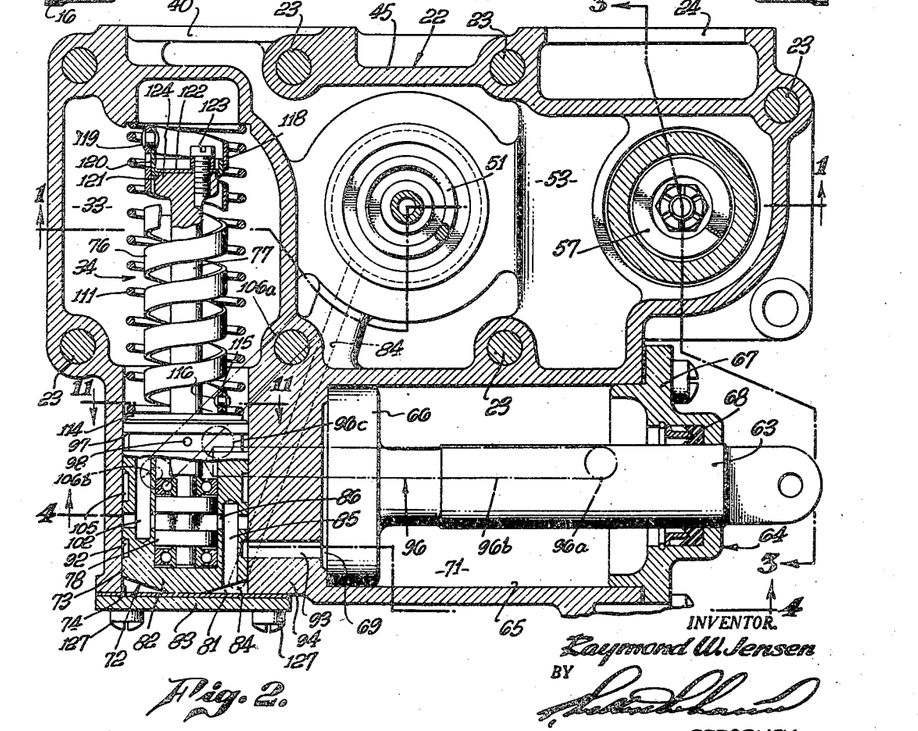
Fig. 2 is a horizontal sectional view through the control mechanism of my invention, taken on the line 2—2 of Fig. 1.

After passing through the core, the oil, cooled by the flow of air through the tubes 14, will pass out of the core through the core outlet 18 into an outlet chamber 32 defined within the valve base 21 into the thermostat chamber 33 in the case 22 (see Figs. 1 and 2). In the chamber 33 the oil acts upon a thermostat, indicated generally at 34, which controls the normal operation of the shutters 36 (Fig. 5) which in turn control the flow of cooling air through the tubes 14. From the chamber 33, the oil passes upwardly through an outlet 37 past a core outlet check valve 38 which tends to close the outlet 37 under the very light pressure of a spring 39 engaged between the valve 38 and a cap 41 which is threaded into an opening 42 in the top wall 43 of the case 22, and which may be removed to permit servicing of the core check valve 38.

Above the chamber 33, between the top wall 43 of the case and the wall 30 (which separates the chamber 33 from the remainder of the space within the case 22, and in which the core outlet port 37 is formed) is a discharge chamber 35, from which the oil may pass out of the case 22 through the outlet 40 in the rear wall 45 of the case.

Oil flowing through the warm up passage 19, after encircling the cooler, will pass through an opening 44 (Fig. 1) in the valve base 21 and enter a chamber 46 defined within the valve base, from which it will pass upwardly into a chamber 47 in the case 22. From the chamber 47, the oil will pass through a warm up outlet 48, past a warm up outlet valve 49 which tends to close the outlet port 48 under the pressure of a spring 51 in compression between the valve 49 and a cap 52 threaded into the top wall 43 of the case 22 and adapted to be removed to permit servicing of the warm up outlet valve 49. The pressure of the spring 51 is heavier than that of the core check valve spring 39, being sufficient to normally maintain the warm up outlet valve 49 closed so as to route all of the oil through the core and through the core outlet port 37. When, however, the back pressure in the core rises sufficiently above the normal operating pressure, the spring 51 will yield and permit the valve 49 to open, thus permitting a portion of the oil to bypass through the warm up passage. From the warm up outlet 48, the oil passes into a bypass chamber 53 which forms an extension of the discharge chamber 35 and, together with the latter, the low pressure chamber of the pressure control mechanism. With increasing back pressure in the core, the opening of the valve 49 will increase until (for example, when the core has become fully congealed) the entire flow will be through the warm up passage or through the latter and the direct bypass which will now be described.

The inlet chamber 26 in the case 22 is separated from the low pressure chamber 35 by a wall 54 in which is formed a bypass outlet port 55 through which direct communication may be established from the inlet chamber 26 to the bypass chamber 53 and thence to the casing outlet 40. The port 55 is normally closed by a bypass valve 56 under the pressure of a spring 57 engaged between the valve 56 and a cap 58 which may be removed for servicing of the valve 56. The valve 56 forms part of a surge valve assembly, including an inlet protective valve 59 connected to the bypass valve 56 by a stem 61. Under excessive back pressure within the core and the warm up passage, the spring 57 will yield, allowing the bypass valve 56 to open to bypass the oil directly through the bypass chamber 53 to the outlet 40 and the protective valve 59 to close to protect the core and the warm up jacket from the excess pressure.

The airflow control shutters 36 are connected by linkage 62 to the piston rod 63 of the servomotor 64 which includes a cylinder 65 formed integrally with the case 22, a piston 66, operating in the cylinder 65, and a cap 67 for the cylinder 65, the cap having a packing gland 68 through which the piston rod 63 is slidably extended. Between the piston 66 and the opposite ends of the cylinder 65 there are formed the chambers 69 and 71, into one or the other of which oil under pressure from the warm up outlet chamber 47 is adapted to be injected under the control of the control valve 72.

The valve 72 comprises a piston 73, preferably cylindrical, axially slidable in a cylinder 74 which is formed integrally with the case 22 and lies adjacent the inner end of the servomotor cylinder 65. The cylinder 74 communicates with the outlet chamber 33. The thermostat 34, received in the outlet chamber 33, includes a bi-metallic coil 76, one end of which is attached to the control valve piston 73 and the other end of which is attached to a shaft 77 which extends into the open rear end of the piston 73 and carries a valve element 78 which is rotatable within the cylindrical bore 79 of the piston 73. The position of the valve element 78 controls the flow of oil through the valve 72 in accordance with the temperature in the outlet chamber 33 and thereby controls the normal movement of the servomotor piston 66.

Figure 9:
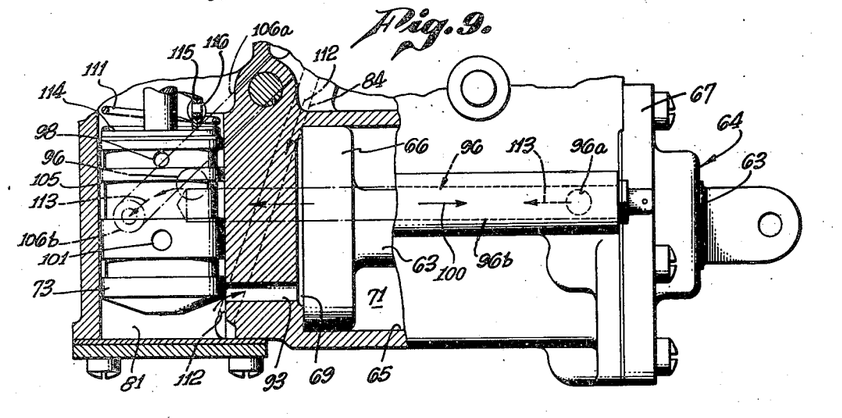
Fig. 9 is a view of the control valve and servomotor mechanism, partially in horizontal section and partially in plan, taken on the line 9—9 of Fig. 4.

This control is made operative by oil under pressure delivered into a chamber 81 defined in the cylinder 74 between the head 82 of the piston 73 and a closure plate 83 sealed to the forward end of the cylinder 74. The oil is delivered to the chamber 81 through a passage 84 in the case 22, communicating at its respective ends with the chamber 47 and the warm up outlet chamber 47 (see Figs. 1 and 2). From the chamber 81, the oil passes through a longitudinal bore 85 in the control valve piston 73 (see Figs. 5 and 6) through a radial port 86 into the piston bore 79 between the circular flanges 87 of the valve element 78. The vane or web portion 88 of the valve element 78, maintained in the position shown in Fig. 6 by the thermostat 34 reacting to overheated oil, will direct the flow from the radial port 86 to the radial port 89, from which the oil will flow through a longitudinal passage 90 in the piston 73 (see Figs. 5, 6, and 7) to a radial port 91 which communicates with an annular passage 92 defined between a groove in the exterior of the piston 73 and the wall of the cylinder 74. From the annular passage 92, the oil passes through a bore 93 in the wall 94 which separates the cylinder 74 from the cylinder 65, and then into the chamber 69 of the cylinder 65. The oil flow just described is indicated by the arrows 95 in Fig. 5. As a result of this flow, the piston 66 will be moved in the direction indicated by the arrow 100 in Fig. 9, moving the shutters 36 toward closed position.

Figure 4:
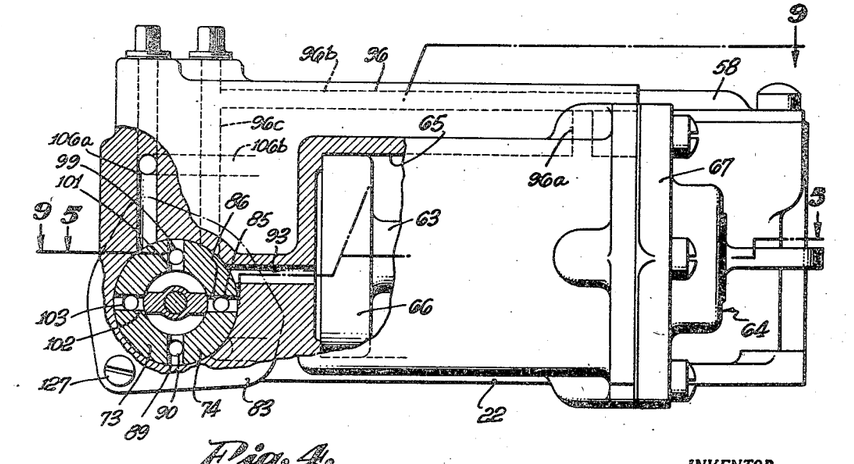
Fig. 4 is a view of the control mechanism, partially in side elevation and partially in section, taken on the line 4—4 of Fig. 2.
Figure 5:
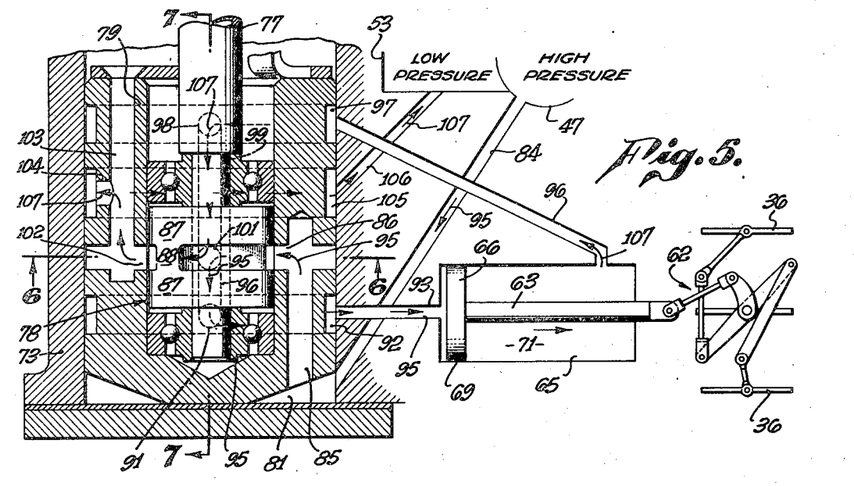
Fig. 5 is an enlarged sectional view of the control valve taken on the line 5—5 of Fig. 4, coupled with a schematic representation of the servomotor mechanism and shutter mechanism, coupled with a flow diagram for shutter closing movement in response to high temperature.
Figure 6:
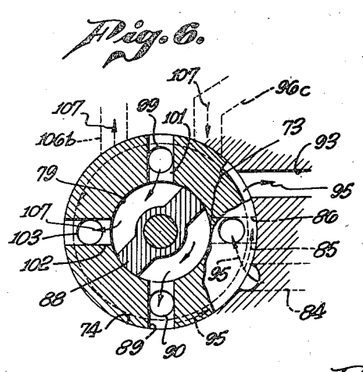
Fig. 6 is a transverse sectional view through the control valve taken on the line 6—6 of Fig. 5, showing the valve in the position for controlling shutter closing movement in response to high temperature conditions.

As the piston 66 moves in the shutter closing direction, the oil from the chamber 71 will escape through a passage 96 (including, as indicated in Fig. 4, a radial port 96a in the wall of the cylinder 65, a bore 96b in the case 22, parallel to the cylinder 65, and a bore 96c extending from the bore 96b down to the control valve cylinder 74), an annular passage 97, defined between the cylinder 74 and the groove in the exterior of the control valve piston 73 (Fig. 5), a radial port 98 in the piston 73 (being above the plane of the section in Fig. 5, the port 98 is indicated in dot and dash lines. It is shown in full lines in Figs. 2 and 7. It may be noted at this point that the dot and dash lines wherever used in the drawings indicate parts that are above or in front of the plane of the section in the respective views in which they occur), a longitudinal bore 99 in the piston 73, a radial bore 101 in the piston 73, the space within the piston bore 79 above the web 88 of the valve element 78 (Fig. 6), a radial port 102, a longitudinal port 103, and a radial port 104 in the piston 73, an annular passage 105 defined between the cylinder 74 and a groove in the exterior of the piston 73, and a bore 106 in the case 22 leading to the low pressure chamber 52 (the passage 106 comprising a bore 106a in the case 22 extending upwardly from the cylinder 74, as shown in Fig. 4, and a bore 106b in the case 22 extending horizontally from the bore 106a to the low pressure chamber 52). This exhaust flow path is indicated by the arrows 107 in Figs. 5 and 6.

Figure 7:
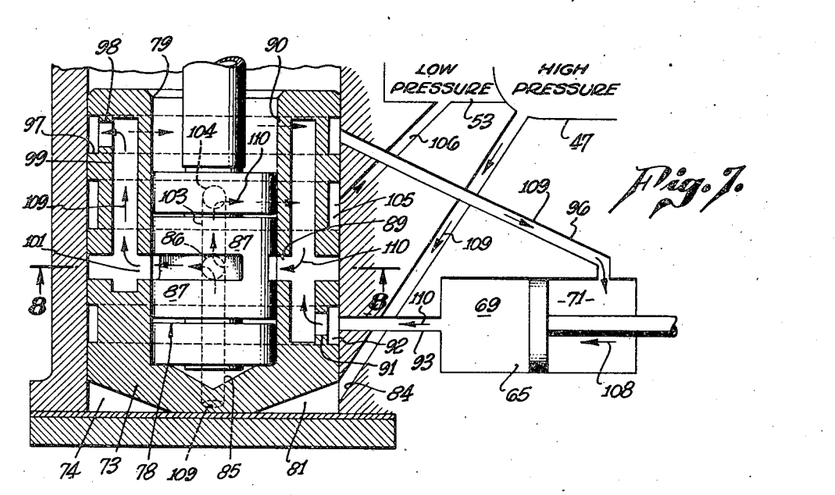
Fig. 7 is an enlarged vertical axial sectional view through the control valve, coupled with a schematic representation of the servomotor mechanism and a flow diagram for shutter closing movement in response to reduced temperature conditions.
Figure 8:
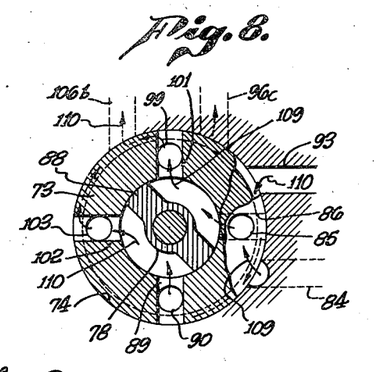
Fig. 8 is a transverse sectional view through the control valve taken on the line 8—8 of Fig. 7 and showing the valve in the position for controlling shutter closing movement in response to reduced temperature conditions.

When the temperature of the oil flowing through the outlet chamber 33 rises above the predetermined normal operating temperature range, the control valve element 78 will be moved by the thermostat 76 to a position, such as that shown in Fig. 8, in which the radial port 86 is connected to the radial port 101 and the radial port 89 is connected to the radial port 102. This will permit oil at inlet pressure to flow from the warm up outlet chamber 47 through the bore 84 to the control valve chamber 81, thence through the valve piston passages 85, 86, 101, 89 and 88, and thence through the annular passage 97 and the passage 96 into the servomotor chamber 71, causing the piston 66 to move, as indicated by the arrow 108, in shutter opening direction. This high pressure flow is indicated in Figs. 7 and 8 by the arrows 109. The oil exhausted from the chamber 69 of the servomotor will flow, as indicated by the arrows 110 in Figs. 7 and 8, through the bore 93, the annular passage 92, the control valve piston passages 91, 90, 89, 102, 103, and 104, thence through annular passage 105 and passage 106 to the low pressure chamber 52.

The piston 73 is normally maintained with its forward end bearing against the closure plate 83 under the yielding pressure of a coil spring 111, one end of which is engaged against the rear end of the piston 73 and the other end of which is engaged against the case 22 at the rear end of the outlet chamber 33, as shown in Fig. 2. The pressures developed in the chamber 81 in the normal operation of the servomotor described above, are insufficient to overcome the pressure of the spring 111. When, however, under the unusual conditions which cause oil to congeal on the surfaces of the tubes 14, the oil flow passages in the cooler core become sufficiently obstructed to cause the back pressure in the core to exceed a predetermined excess level, the correspondingly increased pressure in the chamber 81, transmitted through the passage 84, will overcome the pressure of the spring 111 and move the piston 73 rearwardly until direct communication is established between the chamber 81 and the port 93 and the annular passage 105 establishes direct communication between the bores 96b and 106b. The high pressure fluid is thus permitted to flow as indicated by the arrows 112 into the servomotor chamber 69, moving the piston 66 in shutter closing direction, as indicated by the arrow 100, and the oil exhausted from the servomotor chamber 71 through the passage 96 will flow through the annular passage 105, through the passage 106 and thence directly to the low pressure chamber 52. The endwise movement of the piston 73 thus overrides the controlling action of the valve element 78, which, at the low temperature of the oil in the outlet chamber 33 under the conditions just described, would tend to open the shutters more widely, and thereby aggravate the congealment.

Figure 11:
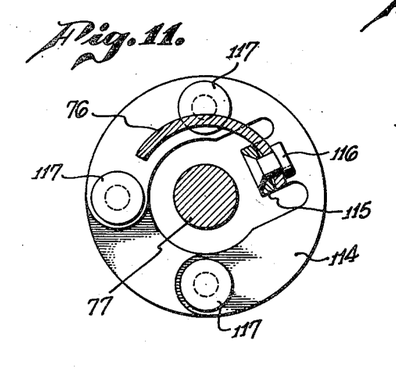
Fig. 11 is a transverse sectional view through the thermostat taken on the line 11—11 of Fig. 2, and illustrating the connection of the thermostat to the control valve.

The bi-metallic coil 76 is secured to the piston 73 by means of a U-shaped bracket 114 (Fig. 11) having an upturned finger 115 to which the coil 76 is attached by a rivet 116, and a plurality of headed plugs 117 which extend through the bracket 114 and are driven into the dead end of the axial bores 90, 103 and 99 respectively, thus serving the dual function of attaching the bracket 114 to the piston 73 and sealing the ends of these bores.

The invention provides for adjustment of the temperature range to which the valve 72 is responsive. This adjustment is provided for by an adjustable connection between the bi-metallic coil 76 and the rear end of the shaft 77, comprising a ring 118 secured at 119 to the rear end of the coil 76 and having an inturned radial flange 120 adapted to be clamped between a shoulder 121 on the outer end of the shaft 77 and a hold-down plate 122 secured by a screw 123 to the end of the shaft 77. The shaft 77 has an end portion 124 projecting beyond the shoulder 121 and into the ring 118 to cooperate with the flange 120 in piloting the ring 118 in centered relation to the shaft 77. The parts just described are shown in Fig. 2.

Figure 10:
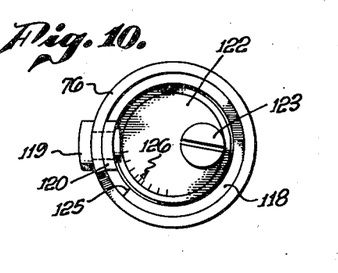
Fig. 10 is an end view of the thermostat, showing the adjustment mechanism.

Referring now to Fig. 10, the ring 118 is provided with an indicator mark 125 which cooperates with a plurality of indicator marks, including a central mark 126 on the face of the hold-down plate 122, to indicate the position of adjustment. When the marks 125 and 126 register, the valve is set for a normal temperature in the outlet chamber 33, which may be, for example, 170° F. The marks on either side of the central mark 126 indicate predetermined variations from this normal temperature. The screw 123, when tightened, clamps the flange 120 between the hold-down plate 122 and the shoulder 121 so as to securely hold the parts in any position to which they may have been adjusted. Loosening the screw 123 permits the shaft 77 to rotate with reference to the coil 76 to a new position of adjustment, which may be fixed by again tightening the screw 123. Access to the adjustment mechanism is obtained by removing the closure plate 83 (which, for that purpose, is detachably secured by screws 127) and removing the valve and thermostat unit bodily from the cylinder 74.

The piston 73 may or may not be fixed against rotation in the cylinder 74. The position of orientation of the piston about its longitudinal axis is immaterial, and, in order to avoid the use of an unnecessary element, I prefer to mount the piston in the cylinder 76 without rotational restraint, but, for convenience in illustrating and describing the invention, I have shown the piston 73 in the same position with reference to the cylinder 74 in all of the figures.

In the operation of the oil cooler described above, the oil is pumped by the pumping mechanism of the airplane lubrication system through the inlet 24 into the warm up passage 19, past the protective valve 59, thence through the cooler core (if the oil passages therein are free and the oil temperature is sufficiently high so that the back pressure in the core does not exceed the normal operating range) or through the warm up passage 19 to the warm up outlet chamber 47 (if the core back pressure is in excess of the normal operating range due to congealment of oil on the tubes 14, in which case the warm up outlet valve 49 will open to permit outflow through the warm up outlet 48 to the bypass chamber 53). As the oil flows through the core, during normal operation, cooling air will be passed through the tubes 14 in a quantity (regulated by the shutters 36) sufficient to maintain the temperature in the outlet chamber 33 at the level determined by the adjustment of the rear end of the bi-metallic coil 76 relative to the end of the shaft 77, as described above. Should the outlet temperature drop too far below this predetermined normal operating temperature, the control valve element 78 will be moved by the thermostat to a position, such as that shown in Fig. 6, in which oil from the warm up outlet chamber 47 (under inlet pressure because the valve 49 will be closed or substantially closed during operation within the normal pressure range) will be routed through the flow path described above to move the piston 66 in shutter closing direction, indicated by the arrow 100. The consequent throttling of airflow through the tubes 14 will decrease the heat transfer from the oil to the air and permit the temperature of the oil to rise to within the normal temperature range. As a result of this temperature rise, reflected in the outlet chamber 33, the thermostat will move the control valve element 78 back to neutral position shown in Fig. 4, shutting off the flow to the servomotor and arresting the shutter closing movement at a position of the shutters 36 whereat the operating temperature will be stabilized within the normal operating range until some further change in external conditions requires further adjustment of the shutters. In the event the outlet temperature rises to an excessive level above the normal operating temperature determined by the adjustment of the thermostat, the control valve element 78 will be moved to a position such as that shown in Fig. 8, in which oil at inlet pressure will be routed through the flow path described above, to move the servomotor piston 66 in shutter opening direction, indicated by the arrow 108 in Fig. 9. This movement will terminate when the resulting temperature drop in the outlet chamber 33 causes the thermostat to return the valve element 78 to the neutral position shown in Fig. 4.

It may be noted at this point that the valve element 78 will exercise a gradual throttling action with reference to the ports 86, 89, 102, and 101, as the temperature nears the stabilizing level, so that the servomotor action will be slowed down and brought to a gradual stop.

The normal operation just described will be confined entirely or largely to operation with the oil flow path within the core free of obstruction by congealment. When congealment occurs, the resulting increase in back pressure will cause the warm up outlet valve 49 to open, permitting flow through the warm up passage which operates to thaw out the congealed layers of oil, and also operates, when the pressure reaches a sufficiently excessive level, to move the piston 73 bodily in the cylinder 74 against the pressure of the spring 111, as described above, so as to open up the bypass flow path through the valve 72, in which the high pressure oil enters the servomotor chamber 69 directly from the control valve chamber 81, and is discharged from the servomotor chamber 71 by short circuiting directly from the return passage 96 to the return passage 106 through the annular passage 105, thus moving the shutters toward their closed positions (even though the control valve element 78 may be calling for additional shutter opening movement because of the increased outlet temperature, resulting from the insulating effect of the congealed layers of oil on the tubes 14) and thereby assisting the warm up flow to thaw out the congealed layers, by reducing the heat transfer within the core.

The invention provides an arrangement in which a servomotor having a piston of adequate cross sectional area to operate the shutters under a relatively small differential between inlet and outlet pressure (which is characteristic of coolers of the type designated "Free Flow") is adapted to operate the shutters under both temperature and pressure control. The invention further provides such an arrangement in which both temperature and pressure control are effected through the single control valve unit, including the piston 73, which is axially slidable against the pressure of the spring 111 in order to give the overriding pressure control and which incorporates the temperature responsive control valve element 78, which gives the piston 73 its temperature controlling function.

I claim as my invention:

1. A combined temperature and overriding pressure control mechanism for a cooler for liquids, including means for passing a coolant in heat exchange relation to said liquid and means for varying the flow of said coolant, comprising: a servomotor for operating said flow varying means; control valve mechanism for diverting a portion of said liquid into said servomotor for energizing the same, said control valve mechanism including a cylinder having connections with the heat exchanger for receiving liquid from a high pressure region thereof and discharging the liquid back to a low pressure region thereof, connections between said cylinder and said servomotor for delivering the liquid under pressure to one side of the servomotor and permitting liquid from the other side of the servomotor to return to the cylinder, a piston shiftable in said cylinder under pressure in said liquid above a predetermined value and adapted when thus shifted to direct the flow to said servomotor so as to effect the operation of said coolant flow varying means in a manner to substantially shut off the flow of coolant, and thermo-responsive valve means within said piston and operably connected therewith to control the flow through said connection to the servomotor when said piston is in a normal position determined by pressure in said liquid below said predetermined value, said thermo-responsive valve means being adapted, in response to one class of temperature condition, to assume a position in which it effects the circulation of the liquid through said connections to the servomotor in one direction for operating said flow varying means in one direction, and in response to temperature conditions of a different class, to reverse the connections to the servomotor and effect a reverse flow of the fluid to and from said servomotor, causing said flow varying means to be operated in the opposite direction.

2. A combined temperature and overriding pressure control mechanism for a cooler for liquids, including means for passing a coolant in heat exchange relation to said liquid and means for varying the flow of said coolant, comprising: a servomotor for operating said flow varying means; control valve mechanism for diverting a portion of said liquid into said servomotor for energizing the same, said control valve mechanism including a cylinder having connections with the heat exchanger for receiving liquid from a high pressure region thereof and discharging the liquid back to a low pressure region thereof, connections between said cylinder and said servomotor for delivering the liquid under pressure to one side of the servo motor and permitting liquid from the other side of the servomotor to return to the cylinder, a piston axially slidable in said cylinder under pressure in said liquid above a predetermined value and adapted when thus shifted to direct the flow to said servomotor so as to effect the operation of said coolant flow varying means in a manner to substantially shut off the flow of coolant, and thermo-responsive valve means within and operably connected with said piston for operating same to control the flow through said connections to the servomotor when said piston is in a normal position determined by pressure in said liquid below said predetermined value, said thermo-responsive valve means being adapted, in response to one class of temperature condition, to assume a position in which it effects the circulation of the liquid through said connections to the servomotor in one direction for operating said flow varying means in one direction, and in response to temperature conditions of a different class, to reverse the connections to the servomotor and effect a reverse flow of the fluid to and from said servomotor, causing said flow varying means to be operated in the opposite direction.

3. A combined temperature and overriding pressure control mechanism for a cooler for liquids, including means for passing a coolant in heat exchange relation to said liquid and means for varying the flow of said coolant, comprising: a servomotor for operating said flow varying means; control valve mechanism for diverting a portion of said liquid into said servomotor for energizing the same, said control valve mechanism including a cylinder having connections with the heat exchanger for receiving liquid from a high pressure region thereof and discharging the liquid back to a low pressure region thereof, connections between said cylinder and said servomotor for delivering the liquid under pressure to one side of the servomotor and permitting liquid from the other side of the servomotor to return to the cylinder, a piston shiftable in said cylinder under pressure in said liquid above a predetermined value and adapted when thus shifted to direct the flow to said servomotor so as to effect the operation of said coolant flow varying means in a manner to substantially shut off the flow of coolant, and thermo-responsive valve means rotatable within said piston and connected therewith to control the flow through said connections to the servomotor when said piston is in a normal position determined by pressure in said liquid below said predetermined value, said thermo-responsive valve means being adapted, in response to one class of temperature condition, to assume a position in which it effects the circulation of the liquid through said connections to the servomotor in one direction for operating said flow varying means in one direction, and in response to temperature conditions of a different class, to reverse the connection to the servomotor and effect a reverse flow of the fluid to and from said servomotor, causing said flow varying means to be operated in the opposite direction.

4. A combined temperature and overriding pressure control mechanism for a heat exchanger, including means for circulating therethrough a liquid, the temperature of which is to be controlled and which is subject to varying pressures, and including means for passing a heat transfer fluid in heat exchange relation to said liquid and means for varying the flow of said fluid, said control mechanism comprising: a servomotor for operating said flow varying means; and control valve mechanism for diverting a portion of said liquid into said servomotor for energizing the same, said control valve mechanism including a cylinder through which said liquid is routed to said servomotor, a piston axially shiftable in said cylinder under pressure in said liquid above a predetermined value, and adapted when thus shifted to effect pressure responsive control of the operation of said servomotor, said piston having a cylindrical bore therein, a valve element rotatable in said bore and rendered operative by said piston when the latter is in its position determined by pressure below said predetermined level, to effect thermo-responsive control of said servomotor, and a bi-metallic coil, one end of which is connected to said valve element and the other end of which is connected to said piston, for moving said valve element thermo-responsively.

5. A combined temperature and overriding pressure control mechanism for a heat exchanger, including means for circulating therethrough a liquid, the temperature of which is to be controlled and which is subject to varying pressures, and including means for passing a heat transfer fluid in heat exchange relation to said liquid and means for varying the flow of said fluid, said control mechanism comprising: a servomotor for operating said flow varying means; and control valve mechanism for diverting a portion of said liquid into said servomotor for energizing the same, said control valve mechanism including a cylinder through which said liquid is routed to said servomotor, flow passages communicating with and adapted to transmit liquid to and from said cylinder, a piston axially slidable in said cylinder, said piston having external grooves for communication with said flow passages, a cylindrical internal bore, and passages connecting said bore and grooves, thermo-responsive means, a valve element rotatable in said bore and connected with said thermo-responsive means, means yieldingly urging said piston in said cylinder to a position in which said valve element is rendered operative to control, thermo-responsively, the flow of liquid to said servomotor, said piston being shiftable axially against the resistance of said yielding means, under pressure in said liquid above a predetermined value, to a position in which said grooves connect said flow passages for control of said servomotor overriding said thermo-responsive control.

6. A combined temperature and overriding pressure control mechanism for a system in which liquid is adapted to be circulated under varying conditions of pressure and temperature, comprising: a cylinder, flow passages communicating with said cylinder, a piston in said cylinder having external grooves for communicating with said flow passages, having an internal cylindrical bore and having passages connecting said grooves and bore, thermo-responsive means, a valve element rotatably mounted in said bore and connected with said thermo-responsive means, means yieldingly urging said piston in said cylinder to a position in which said valve element is rendered operative to effect temperature responsive control of the flow of liquid in said passages, said piston being shifted axially under pressure above a predetermined level in one of said flow passages, to a position in which the grooves of said piston cooperate with said flow passages to effect direct control of the flow therethrough overriding the temperature responsive control of said valve element.

7. Mechanism as defined in claim 6, including a bi-metallic thermostat coil, one end of which is anchored to said piston, and the other end of which is connected to said valve element.

8. Mechanism as defined in claim 6, including a shaft secured to said valve element and projecting from the end of said piston, and a bi-metallic thermostat coil, one end of which is secured to said piston and the other end of which is secured to said shaft.

9. Mechanism as defined in claim 6, including a shaft connected to said valve element and projecting from the end of said piston, a bi-metallic thermostat coil, one end of which is connected to said piston, said coil encircling said shaft and having at its opposite end an adjustable connection with said shaft permitting adjustment of the circumferential position of said valve element relative to said coil.

10. Mechanism as defined in claim 6, including a servomotor connected to said flow passages so as to be energized positively in either direction under the control of said piston and valve element.

11. A combined temperature and overriding pressure control mechanism for a system in which liquid is adapted to be circulated under varying conditions of pressure and temperature comprising: a cylinder, flow passages communicating therewith, a piston axially shiftable in said cylinder, means yieldingly urging said piston toward a normal position, from which fluid from one of said passages is adapted, above a predetermined pressure level, to move said piston axially to a secondary position, said piston having a cylindrical bore and a plurality of passages for establishing communication between said bore and flow passages, and thermo-responsive means, a valve element rotatably mounted in said bore, said valve element being connected with the thermo-responsive means and made operative in said normal position of said piston to control the flow through said flow passages, said piston directly controlling the flow through said flow passages when in said secondary position and operable by abnormal pressure within the system overriding the controlling effect of said valve element.

RAYMOND W. JENSEN.

REFERENCES CITED

The following references are of record in the file of this patent:

UNITED STATES PATENTS

| Number | Name | Date |
| --- | --- | --- |
| 2,353,546 | Chisholm | July 11, 1944 |
| 2,353,692 | Cunningham | June 18, 1944 |
| 2,365,223 | Silverstein | Dec. 19, 1944 |